(12) United States Patent
Cote

(10) Patent No.: US 10,010,051 B2
(45) Date of Patent: Jul. 3, 2018

(54) SQUIRREL BUNGEE APPARATUS

(71) Applicant: Paul L. Cote, Knowlton (CA)

(72) Inventor: Paul L. Cote, Knowlton (CA)

( * ) Notice: Subject to any disclaimer, the term of this patent is extended or adjusted under 35 U.S.C. 154(b) by 328 days.

(21) Appl. No.: 15/058,301

(22) Filed: Mar. 2, 2016

(65) Prior Publication Data

US 2017/0251632 A1  Sep. 7, 2017

(51) Int. Cl.
  *A01M 5/00*  (2006.01)
  *A01K 5/01*  (2006.01)
  *A01K 15/02* (2006.01)
  *A01K 5/00*  (2006.01)

(52) U.S. Cl.
  CPC .............. *A01K 5/0114* (2013.01); *A01K 5/00* (2013.01); *A01K 15/02* (2013.01)

(58) Field of Classification Search
  CPC ........ A01K 5/0114; A01K 5/00; A01K 15/02; A01K 15/025; A01K 15/026; A01K 15/027; A63H 3/10; A63H 3/16; A63H 3/20; A63H 3/46; A01M 31/06
  See application file for complete search history.

(56) References Cited

U.S. PATENT DOCUMENTS

| | | | | |
|---|---|---|---|---|
| 839,770 A * | 12/1906 | Kalkbrenner | ............ | A63H 3/18 446/359 |
| 1,210,266 A * | 12/1916 | Bickelhaupt | ............. | A63H 3/20 446/330 |
| 1,311,553 A * | 7/1919 | Criest | ...................... | A63H 3/18 446/359 |
| 2,698,598 A * | 1/1955 | Hadley | ................ | A01K 15/025 119/708 |
| 4,632,062 A * | 12/1986 | Hubbard | ............ | A01K 39/0106 119/51.03 |
| 5,111,771 A * | 5/1992 | Mathews | ............. | A01K 15/025 119/708 |
| 5,664,522 A * | 9/1997 | Keller | .................. | A01K 5/0114 119/51.03 |
| 6,085,692 A * | 7/2000 | Adams | ................. | A01K 5/0114 119/51.03 |
| 6,474,260 B1 | 11/2002 | Shultz | | |
| 6,575,119 B1 * | 6/2003 | Lonsway | ............. | A01K 15/025 119/707 |
| 7,225,579 B2 * | 6/2007 | Haley | ................... | A01M 31/06 43/3 |
| 9,265,246 B2 * | 2/2016 | Thomas | ................ | A01M 31/06 |
| 9,545,080 B1 * | 1/2017 | Cote | ........................ | A01K 5/00 |

* cited by examiner

*Primary Examiner* — Kathleen I Alker
(74) *Attorney, Agent, or Firm* — Dennis L. Thomte; Thomte Patent Law Office LLC

(57) ABSTRACT

A squirrel bungee apparatus is shown. A first plate member is suspended from an overhead structure. A second plate member is pivotally secured to the first plate member whereby the first and second plate members may be moved between first and second positions. A torsion spring interconnects the first and second plate members and yieldably maintains the first and second plate members in their first position. An elongated flexible chain has its upper end secured to the second plate member and has a food item or the like at the lower end thereof. When a squirrel jumps onto the food item, the weight of the squirrel causes the first and second plate members to move from their first position to their second position thereby causing the food item and the squirrel to move downwardly and thence upwardly in a bungee fashion due to the action of the torsion spring.

13 Claims, 5 Drawing Sheets

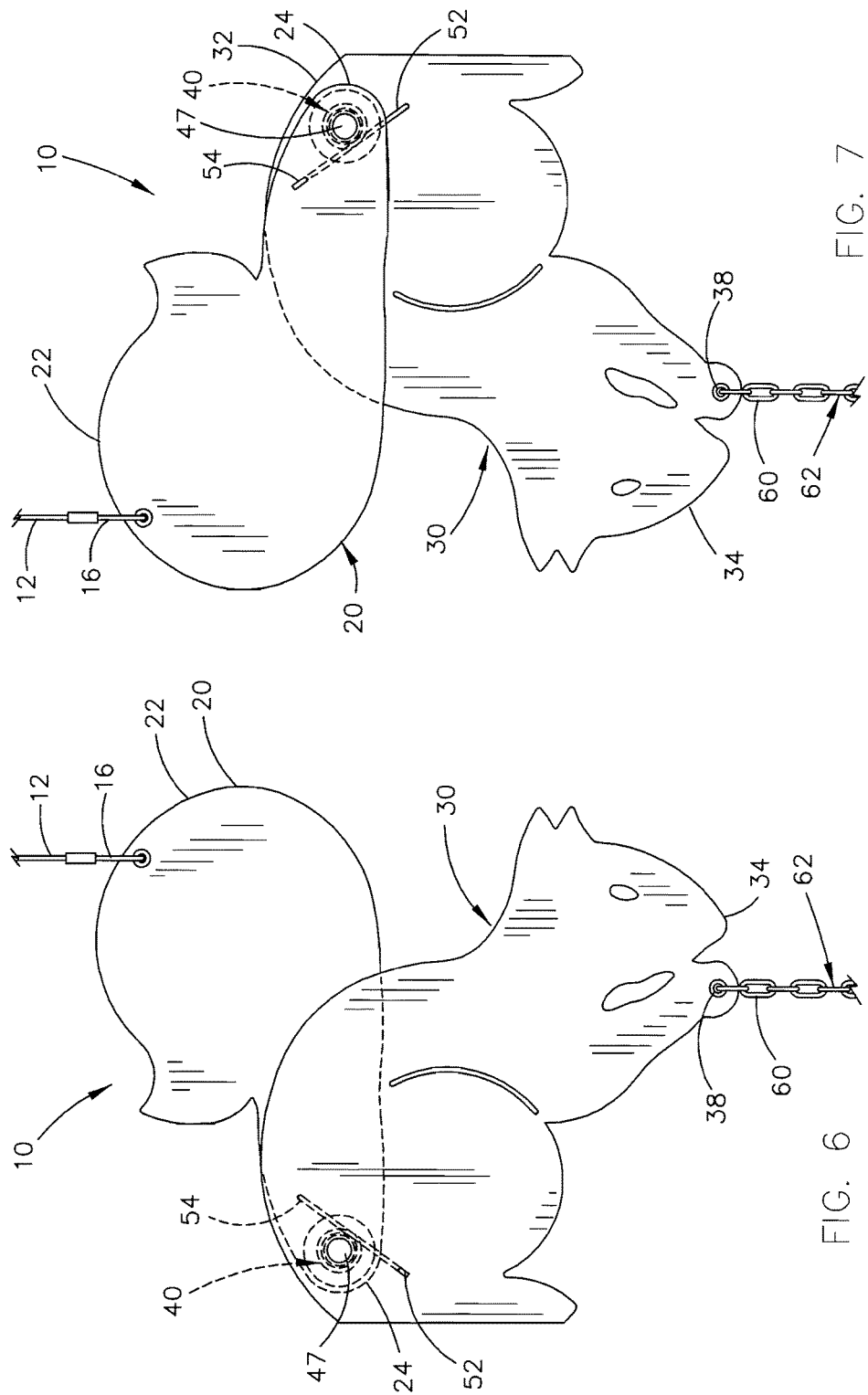

SQUIRREL BUNGEE APPARATUS

BACKGROUND OF THE INVENTION

Field of the Invention

This invention relates to a squirrel bungee apparatus and more particularly to a squirrel bungee apparatus whereby the apparatus has a food item or the like secured to the lower end thereof. More particularly this invention relates to a squirrel bungee apparatus including a torsion spring which causes the food item to be lowered and then raised in a bungee like fashion when a squirrel jumps onto the food item. Even more particularly, this invention relates to a squirrel bungee apparatus which includes first and second plate members which are pivotally connected together with the first plate member having the shape of a squirrel's tail and with the second plate member having the shape of a squirrel's body.

Description of the Related Art

U.S. Pat. No. 6,474,260 B1 illustrates a recoiling-action wildlife feeder which is designed to cause an animal to rise and fall upon the animal jumping onto a food unit suspended from a spring-loaded cable. The spring of the apparatus of the '260 patent must be covered by a safety shroud to prevent birds from coming into contact with the spring.

Although the apparatus of the '260 patent may have met with some success, the instant invention is provided to provide a more attractive appearing apparatus and to provide an apparatus which eliminates the need of a safety shield surrounding a spring.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A squirrel bungee apparatus is disclosed which includes a vertically disposed first plate member having first and second ends and a vertically disposed second plate member having first and second ends. The first end of the second plate member is pivotally secured to the second end of the first plate member by a pivot pin. A hanger, having upper and lower ends, is provided for supporting the apparatus with the upper end of the hanger being configured to be secured to an overhead support and with the lower end of the hanger being pivotally secured to the first plate member at the first end of the first plate member. The first and second plate members are pivotally movable between first and second positions. The apparatus also includes a torsion spring having a central coil portion and first and second spring legs extending therefrom. The central coil portion of the torsion spring embraces the pivot pin between the first and second plate members with the free end of the first spring leg being attached to the first plate member and with the free end of the second spring leg being attached to the second plate member. The spring action of the torsion spring and the connection of the first and second spring legs to the first and second plate members respectively yieldably maintains the first and second plate members in the first position. An elongated flexible support is also provided which has upper and lower ends with the upper end of the flexible support being secured to the second plate member at the second end of the second plate member. A squirrel attraction device such as a food item is secured to the lower end of the flexible support whereby the weight of a squirrel jumping onto the squirrel attraction device or food item will cause the first and second plate members to be moved back and forth from their first position to their second position and from their second position to their first position causing the squirrel to rise and fall in a bungee-like manner.

In the preferred embodiment, the first plate member has the shape of a squirrel's tail and the second plate member has the shape of a squirrel's body.

It is therefore a principal object of the invention to provide a squirrel bungee apparatus.

A further object of the invention is to provide a squirrel bungee apparatus including first and second plate members which are pivotally secured together and which are yieldably maintained in a first position by a torsion spring but which permits the plate members to pivot to a second position upon a squirrel jumping on the food item or the like.

A further object of the invention is to provide a squirrel bungee apparatus which includes a torsion spring mounted between a pair of pivotal plate members.

A further object of the invention is to provide a squirrel bungee apparatus including a torsion spring which is shielded by a pair of plate members to prevent birds from coming into contact with the torsion spring.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6 is a partial first side elevational view of the squirrel bungee apparatus of this invention in its normal position; and FIG. 7 is a partial second side elevational view of the squirrel bungee apparatus in its normal position.

DESCRIPTION OF THE PREFERRED EMBODIMENT

Figure 1:
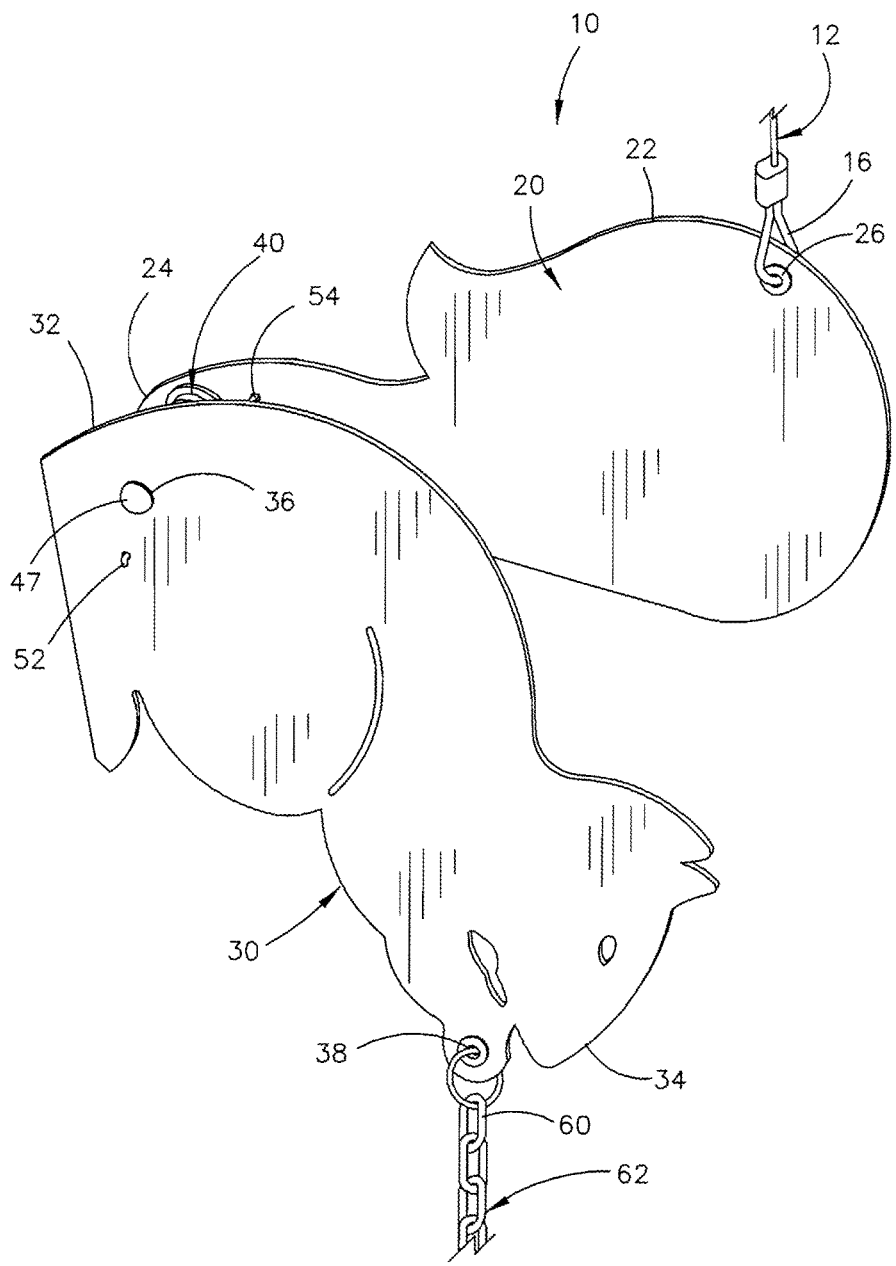
FIG. 1 is a partial perspective view of the squirrel bungee apparatus of this invention in its normal position.
Figure 2:
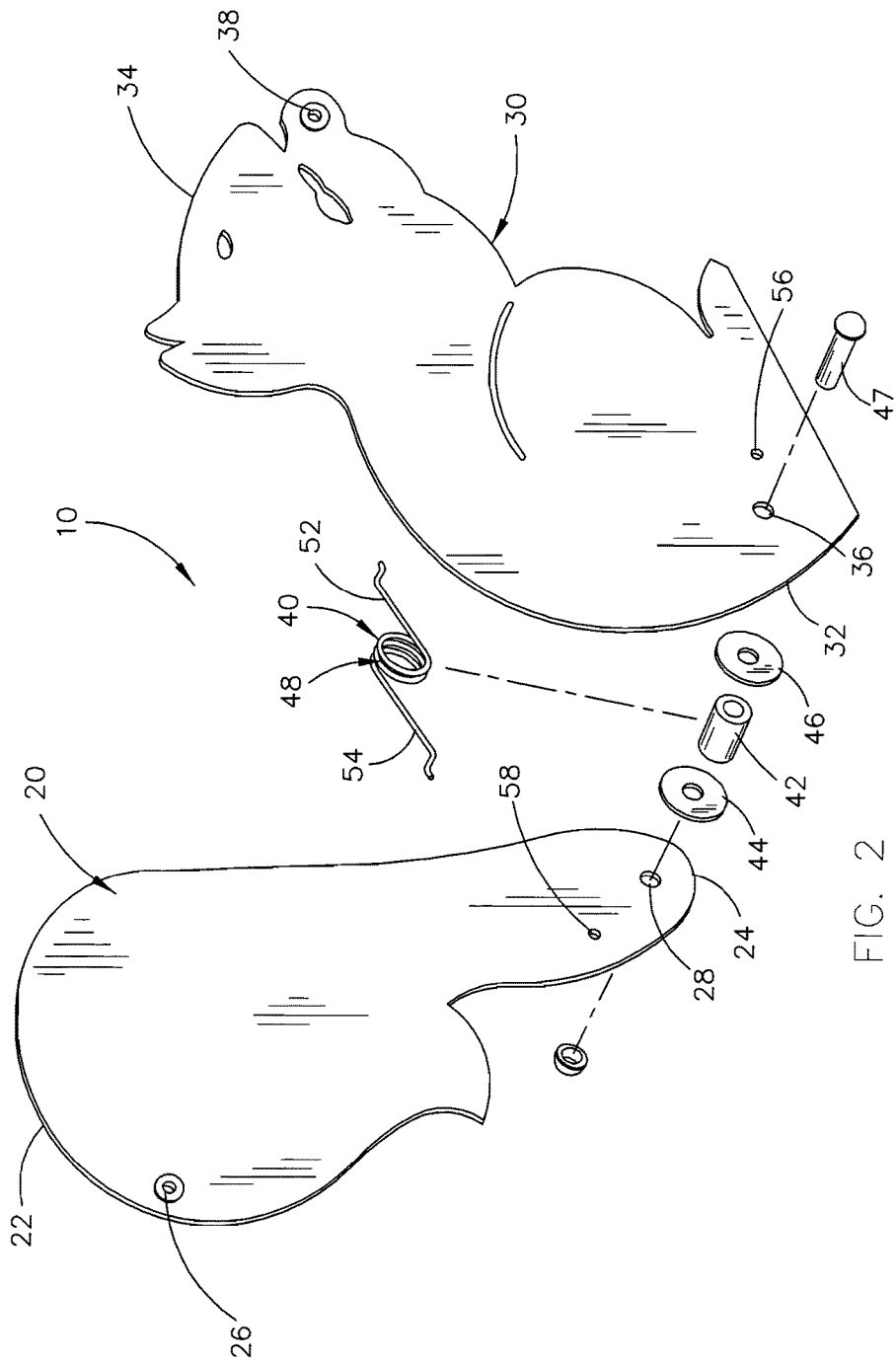
FIG. 2 is a partial exploded perspective view of the squirrel bungee apparatus of this invention.
Figure 3:
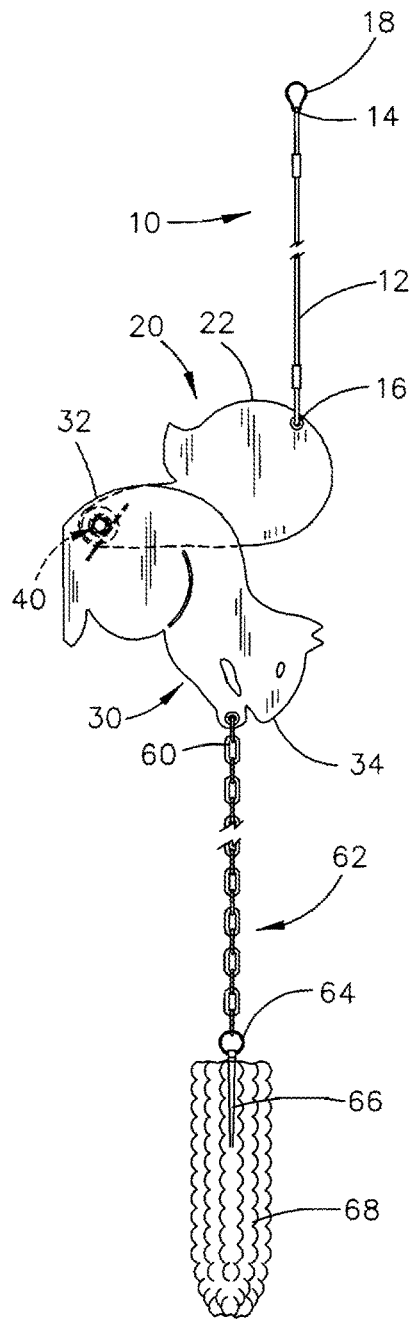
FIG. 3 is a side elevational view of the squirrel bungee apparatus of this invention in its normal position.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The squirrel bungee apparatus of this invention is referred to by the reference numeral 10. Apparatus 10 includes an elongated flexible cable 12 having an upper end 14 and a lower end 16. A snap hook 18 is secured to the upper end 14 of cable 12 to enable the apparatus 10 to be secured to an overhead support structure.

Apparatus 10 also includes a first or upper vertically disposed plate member 20 having a first end 22 and a second end 24. Plate member 20 is preferably comprised of a painted or colored metal material but could be comprised of other materials such as plastic, etc. As seen, plate member 20 has the shape of a squirrel's tail. Plate member 20 has an opening 26 formed therein at its upper end 22. The lower end 16 of cable 12 is secured to plate member 20 by a loop in cable 12 which is received in opening 26. Cable 12 could be secured to plate member 20 by a snap hook or other means. Plate member 20 has a pivot pin opening 28 formed therein at its second end.

The numeral 30 refers to a second vertically disposed plate member having a first end 32 and a second end 34. Plate member 30 is preferably comprised of a painted or colored metal material but could be comprised of other materials such as plastic, etc. Plate member 30 has a pivot pin opening 36 formed therein at its first end 32 and an opening 38 formed thereon at its second end 34. As seen, plate member 30 has the shape of a squirrel's body.

The numeral 40 refers to a torsion spring assembly which is positioned between plate members 20 and 30. Torsion spring assembly 40 includes a hub 42 having plates or washers 44 and 46 at the ends thereof. A pivot pin or shaft 47 extends through opening 36 in plate member 30, through washer 46, through hub 42, through washer 44, and through opening 28 in plate member 20 to not only pivotally connect plate members 20 and 30 together but to also provide a means for supporting the torsion spring assembly 40.

Torsion spring assembly 40 includes a torsion spring 48 having its coil portion embracing hub 42. Spring legs 52 and 54 extend from the opposite ends of coil portion. The free end of spring leg 52 passes through an opening 56 formed in plate member 30. The free end of spring leg 54 passes through an opening 58 formed in plate member 20.

The upper end 60 of a flexible chain 62 is attached to the second end 34 of plate member 30 by a ring member extending through the opening 38 as seen in FIG. 1. The lower end 64 of chain 62 has a member 66 which is designed to be secured to a squirrel attraction device such as food item 68 which may be an ear of corn, a feed block, a log of feed, etc.

The functioning of the squirrel bungee apparatus 10 will now be described. The upper end 14 of cable 12 is secured to an overhead support such as a pole, post, etc., by way of the hook 18. A food item, such as an ear of corn 68, etc., is secured to the member 66. At that time, the torsion spring assembly 40 will yieldably maintain the plate members 20 and 30 in the position illustrated in FIGS. 1, 3, 5 and 6 due to the attachment of the spring legs 52 and 54 to the plate members 30 and 20 respectively. The positioning of the torsion spring assembly 40 between the plate members 20 and 30 prevents birds from coming into contact with the coil portion and the spring legs 52 and 54 thereby preventing injury to the birds.

Figure 4:
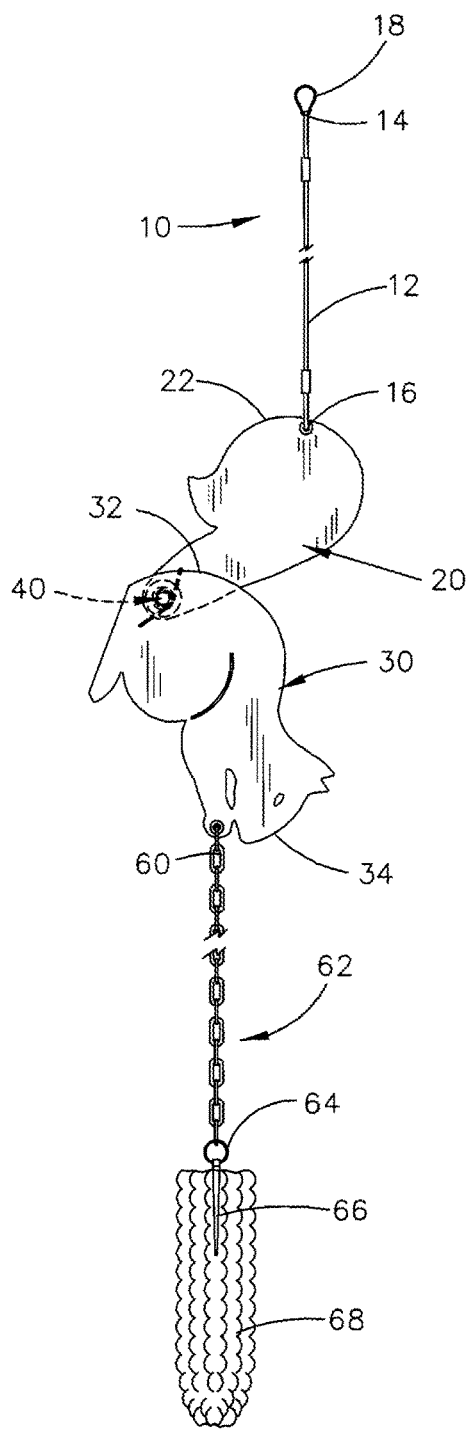
FIG. 4 is a side elevational view of the squirrel bungee apparatus of this invention in its extended or lowered position.
Figure 5:
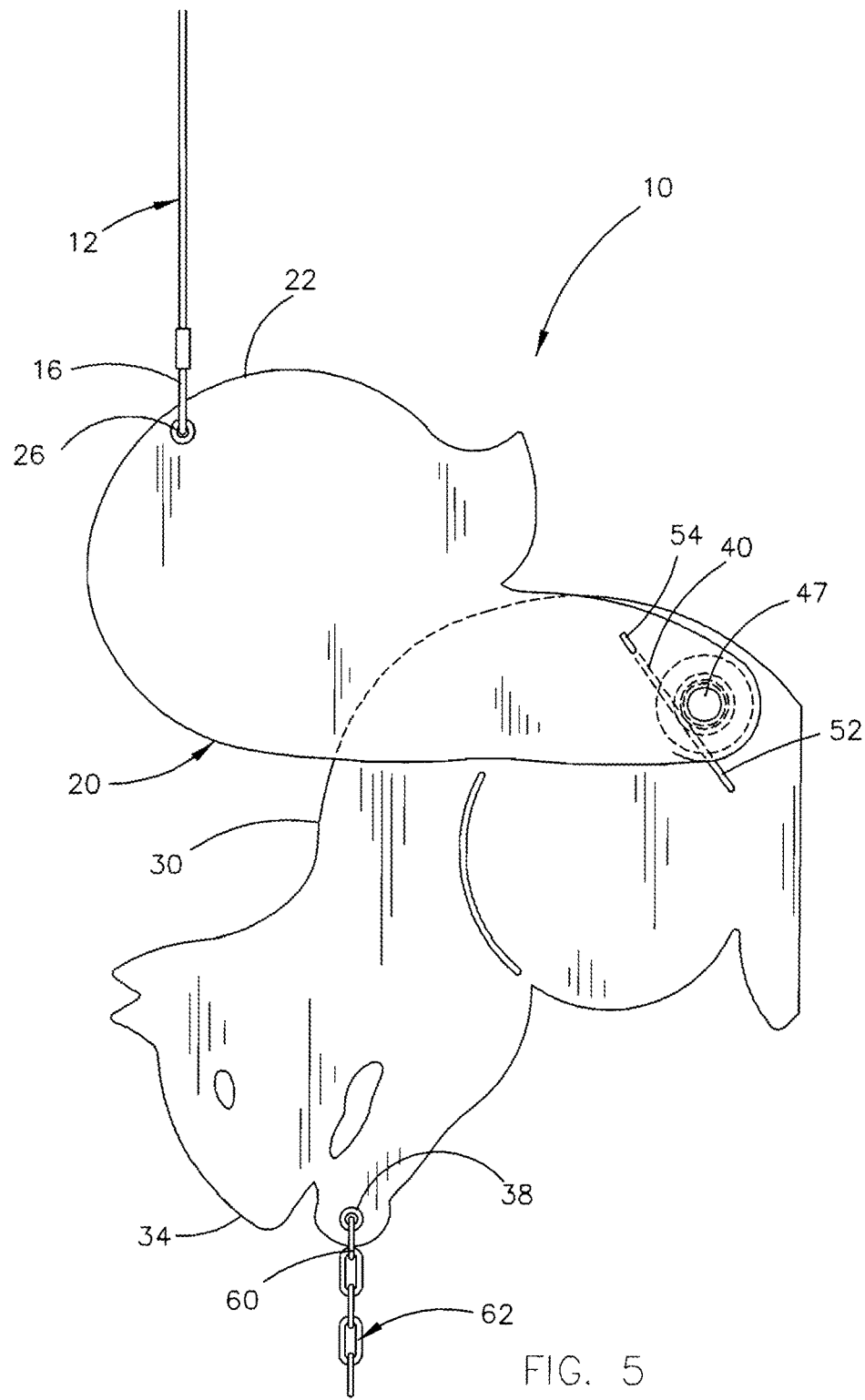
FIG. 5 is a partial side elevational view of the squirrel bungee apparatus of this invention in its normal position.

The food item 68 will normally be positioned above ground level so that a squirrel will have to jump upwardly onto the food item 68 to gain access thereto. When the squirrel jumps onto the food item 68, the weight of the squirrel on the food item 68 will cause the plate members 20 and 30 to pivotally move from the normal position of FIGS. 1, 3, 5 and 6 to the extended position of FIG. 4 against the spring action of the torsion spring assembly 40 thereby causing the food item 68 and the squirrel to be lowered. The torsion spring assembly 40 will then pivotally return the plate members 20 and 30 to the position of FIGS. 1, 3, 5 and 6 thereby causing the food item 68 and the squirrel to move upwardly. The squirrel will be moved downwardly and upwardly in a bungee fashion as the squirrel moves on the food item 68. The squirrel may also be spinned during the bungee-like movement.

The fact that the plate member 20 has the shape of a squirrel's tail and the plate member 30 has the shape of the body of a squirrel makes the apparatus very attractive.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A squirrel bungee apparatus, comprising:
    a vertically disposed first plate member having first and second ends;
    a vertically disposed second plate member having first and second ends;
    said first end of said second plate member being pivotally secured to said second end of said first plate member by a pivot pin;
    a hanger, having upper and lower ends, for supporting the apparatus;
    said upper end of said hanger being configured to be secured to an overhead support;
    said lower end of said hanger being pivotally secured to said first plate member at said first end thereof;
    said first and second plate members being pivotally movable between first and second positions;
    a torsion spring having a central coil portion and first and second spring legs extending therefrom;
    said central coil portion of said torsion spring being mounted on said pivot pin between said first and second plate members;
    said first spring leg being attached to said first plate member;
    said second spring leg being attached to said second plate member;
    the spring action of said torsion spring and the connection of said first and second spring legs to said first and second plate members respectively yieldably maintaining said first and second plate members in said first position;
    an elongated flexible support member having upper and lower ends;
    said upper end of said flexible support member being secured to said second plate member at said second end thereof; and
    a squirrel attraction device secured to said lower end of said flexible support member whereby the weight of a squirrel jumping onto the squirrel attraction device will cause said first and second plate members to be moved back and forth from their said first position to their said second position and from their said second position to their said first position thereby causing the squirrel to rise and fall.

2. The squirrel bungee apparatus of claim 1 wherein said first plate member has the shape of a squirrel's tail and wherein said second plate member has the shape of a squirrel's body.

3. The squirrel bungee apparatus of claim 1 wherein said squirrel attraction device is a food item.

4. The squirrel bungee apparatus of claim 3 wherein said food item is an ear of corn.

5. The squirrel bungee apparatus of claim 3 wherein said food item is a feed block.

6. The squirrel bungee apparatus of claim 3 wherein said food item is a log of feed.

7. A squirrel bungee apparatus, comprising:
a vertically disposed first plate member having first and second ends;
a vertically disposed second plate member having first and second ends;
said second plate member being pivotally secured at its said first end to said first plate member at said second end of said first plate member;
a hanger, having upper and lower ends, for supporting the apparatus;
said upper end of said hanger being configured to be secured to an overhead support;
said lower end of said hanger being pivotally secured to said first plate member at said first end of said first plate member;
said first and second plate members being pivotally movable between first and second positions;
a spring positioned between said first and second plate members which interconnects said first and second plate members;
said spring yieldably maintaining said first and second plate members in said first position;
said spring yieldably resisting the pivotal movement of said first and second plate members from their said first position to their said second position;
an elongated flexible support having upper and lower ends;
said upper end of said flexible support being secured to said second plate member at said second end of said second plate member; and
said lower end of said flexible support being configured to have a food item secured thereto whereby the weight of a squirrel jumping onto the food item will cause said first and second plate members to be moved back and forth from their said first position to their said second position and from their said second position to their said first position causing the squirrel to rise and fall.

8. The squirrel bungee apparatus of claim 7 wherein said first plate member has the shape of a squirrel's tail and wherein said second plate member has the shape of a squirrel's body.

9. The squirrel bungee of claim 7 wherein the food item is an ear of corn.

10. The squirrel bungee of claim 7 wherein the food item is a block of feed.

11. The squirrel bungee of claim 7 wherein the food item is a log of feed.

12. The squirrel bungee of claim 7 wherein said spring is a torsion spring.

13. The squirrel bungee of claim 7 wherein a pivot pin pivotally secures said first and second plate members together and wherein said spring is a torsion spring mounted on said pivot pin between said first and second plate members.

* * * * *